(12) United States Patent
Suzuki et al.

(10) Patent No.: US 7,912,130 B2
(45) Date of Patent: Mar. 22, 2011

(54) MOVING PICTURE CODING APPARATUS

(75) Inventors: Shingo Suzuki, Tokyo (JP); Yoshihiro Kikuchi, Tokyo (JP); Yuji Kawashima, Tokyo (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 1198 days.

(21) Appl. No.: 11/477,282

(22) Filed: Jun. 29, 2006

(65) Prior Publication Data

US 2007/0009040 A1   Jan. 11, 2007

(30) Foreign Application Priority Data

Jul. 6, 2005   (JP) .................................. 2005-198070

(51) Int. Cl.
  *H04N 11/04*   (2006.01)
  *G06K 9/36*   (2006.01)
(52) U.S. Cl. .................................. 375/240.17; 382/238
(58) Field of Classification Search .................. 348/699, 348/412, 415, 401, 416, 439; 382/238, 236, 382/240, 248, 235; 375/240.16, 240.12, 375/240.14, 240.15, 240.13, 240.17, 240.24
See application file for complete search history.

(56) References Cited

OTHER PUBLICATIONS

H.264/AVC Textbook, by S. Okubo et al; Aug. 11, 2004; p. 82, p. 119.

*Primary Examiner* — Behrooz Senfi
(74) *Attorney, Agent, or Firm* — Holtz, Holtz, Goodman & Chick, PC

(57) ABSTRACT

While accuracy of motion compensated prediction is kept high, reduction in processing amount is made possible. When motion compensated prediction is performed on inputted image data by a motion vector detection section, first, reference is made to past three reference frames stored in a reference image storage section, integer search is performed on the image data for each macroblock, and a motion prediction vector is detected by this. Based on the detection result of the motion prediction vector, a reference frame most appropriate for execution of motion compensated prediction is determined for each blocks. Next, based on the determination result, it is judged whether or not reference frames regarded as most appropriate for all blocks (nine blocks) are coincident to each other. As a result of the judgment, when the same reference frame is selected for all candidate blocks, only the reference frame regarded as most appropriate is made the object of sub-pel search, and the motion prediction vector is detected with sub-pel pixel accuracy.

6 Claims, 3 Drawing Sheets

MOVING PICTURE CODING APPARATUS

CROSS REFERENCE TO RELATED APPLICATION

This application is based upon the benefit of priority from the prior Japanese Application No. P2005-198070, filed Jul. 6, 2005, the entire contents of which are incorporated herein by reference.

BACKGROUND OF THE INVENTION

1. Field of the Invention

The present invention relates to an apparatus for coding a moving picture, and particularly to a moving picture coding apparatus having a function to predict a motion vector from plural reference frames.

2. Description of the Related Art

As a basic system of band-type compression coding for a moving picture, there are a predictive coding system and a transform coding system. There is known that the video signal has statistical properties, that is, there is a correlation between pixels in a frame and between pixels between frames, and high efficiency coding is performed using the properties. The predictive coding system is a system using the correlation in the time domain, whereas the transform coding system is a system using the correlation in the frequency domain.

The predictive coding system is such that a predicted image is created by performing a motion compensated prediction from a past coded image frame (hereinafter referred to as a reference frame), and a difference signal between an image to be coded and the predicted image is coded. The transform coding system is such that what is obtained by dividing a frame into blocks for every pixels is transformed into a frequency domain by the discrete cosine transform (DCT), and an obtained transform coefficient (hereinafter referred to as a DCT coefficient) of each frequency component is quantized and is transmitted. In recent years, a system in which both of them are combined is generally adopted.

For example, in ITU-T (International Telecommunication Union-Telecommunication Standardization Sector) recommendation H.261 or H.263, or in MPEG (Moving Picture Experts Group) by the standardization work group of image compression established under ISO (International Organization for Standardization), coding is performed in, for example, a unit of 16×16 pixel block (hereinafter referred to as a macroblock).

Further, recently, in order to further enhance the compression rate, H.264 is standardized. According to H.264, high efficiency image coding is performed by using various coding modes. For example, Impress Standard Textbook Series "H.264/AVC TEXTBOOK" supervised by Sakae Okubo, cowritten by Shinya Kakuno, Yoshihiro Kikuchi, and Teruhiko Suzuki, Aug. 11, 2004 p 82, p 119, etc. describes the feature of H.264. In this textbook, plural reference frames can be used for the motion compensated prediction, and also with respect to the pixel accuracy of the motion search, ¼ pixel accuracy higher than ½ pixel accuracy adopted in MPEG2 or MPEG4 is adopted. Accordingly, as compared with MPEG2 or MPEG4, it becomes possible to perform the motion compensated prediction with higher accuracy (see, for example, non-patent document 1).

However, as described above, in H.264, plural reference frames can be used for the motion compensated prediction, and ¼ is adopted as the pixel accuracy of the motion search. Thus, the processing amount of the motion compensated prediction is increased in proportion to the number of reference frames, and the increase in the processing amount causes increase in electric power consumption and increase in cost. This is very undesirable especially in a portable terminal in which reduction in size and weight and extension in battery lifetime are one of important problems.

SUMMARY OF THE INVENTION

The invention has been made in view of the above circumstances, and an object thereof is to provide a moving picture coding apparatus in which the processing amount can be reduced while the accuracy of motion compensated prediction is kept high.

In order to achieve the object, a moving picture coding apparatus is provided, which comprises storing means configured to store a plurality of picture frames, blocking means configured to divide a frame to be coded into a plurality of blocks, calculating means configured to calculate a motion vector with integer accuracy between the divided blocks and the picture frames stored in the storing means, first selecting means configured to select an optimum picture frame as a reference frame based on the calculated motion vector, counting means configured to count, for each picture frames, number of times the picture frame is selected as a reference frame, and second selecting means configured to select a picture frame to be used for motion compensation prediction with sub-pel accuracy if there is a picture frame having the number of times counted by the counting means satisfying a predetermined condition.

DETAILED DESCRIPTION OF THE INVENTION

Hereinafter, embodiments of the invention will be described with reference to the drawings.

Figure 1:
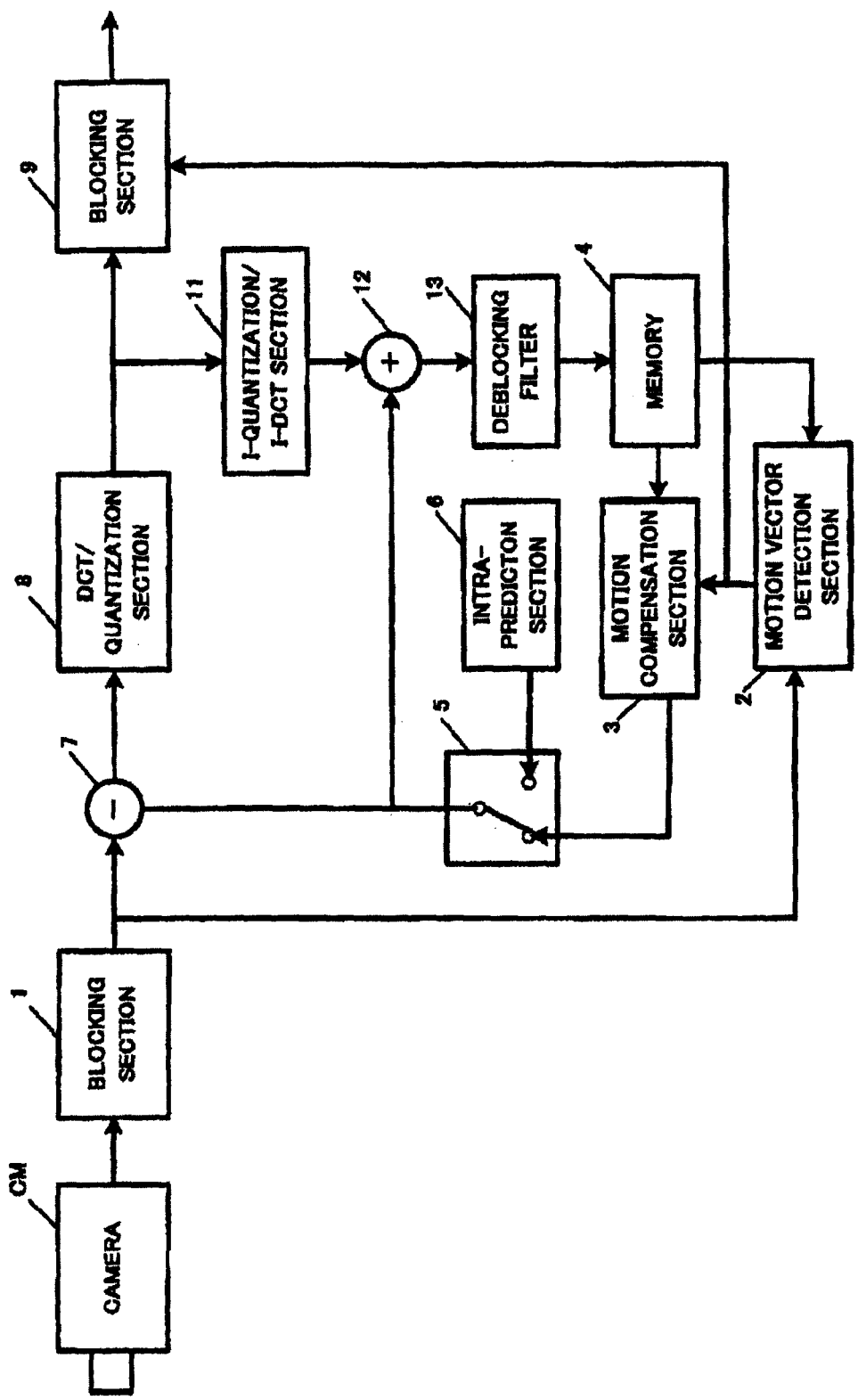
FIG. 1 is a block diagram showing an embodiment of a moving picture coding apparatus of the invention.

FIG. 1 is a block diagram showing an embodiment of a moving picture coding apparatus of the invention.

The moving picture coding apparatus of this embodiment includes a blocking section 1. The blocking section 1 divides image signals of one frame outputted from a camera CM into macroblocks. The size of the macroblock is 16×16 pixels. The macroblock outputted from the blocking section 1 is inputted to a motion vector detection section 2 and a subtractor 7, respectively.

In the case where an inter-coding mode is selected, the motion vector detection section 2 refers to plural past coded frames (hereinafter referred to as reference frames) stored in a memory 4 for reference frame storage, and detects a motion vector for each macroblock generated by the blocking section 1.

In the process of detecting the motion vector, first, the macroblock is further divided into blocks with various sizes. Next, for each of the divided blocks, integer search and sub-pel search are sequentially performed on plural reference frames. Between the integer search and the sub-pel search, a processing to narrow reference frames as objects of the sub-pel search is performed. The narrowing processing of the reference frames will be described later in detail.

Incidentally, the shape of the block as the object of the motion vector detection has, for example, four kinds: 16×16 pixels, 16×8 pixels, 8×16 pixels and 8×8 pixels. These are called macroblock (MB) types. Besides, among the MB types, each block of 8×8 pixels is further divided to form 8×8 pixels, 8×4 pixels, 4×8 pixels and 4×4 pixels. These are called sub-macroblock (SubMB) types.

A motion compensation section 3 creates motion compensated predicted image data based on the motion vector detected by the motion vector detection section 2 and the reference frame stored in the memory 4 for reference frame storage. A selection circuit 5 selects one of the predicted image data in the macroblock units created by the motion compensation section 3 and intra-predicted image data in the macroblock units created by an intra-prediction section 6, and outputs it to the subtractor 7.

The selection operation of the selection circuit 5 is controlled by a coding control section (not-shown). That is, the coding control section compares the cost, for example SAD (Sum of Absolute Difference) value, of the predicted image data created by the motion compensation section 3 with the cost of the intra-predicted image data created by the intra-prediction section 6, and performs a switching control so that the selection circuit 5 selects one with higher cost.

The subtractor 7 subtracts the predicted image data selected by the selection circuit 5 from the image data of the current frame outputted from the block cutout section 1, and obtains a residual signal. The residual signal is inputted to a discrete cosine transform (DCT) and quantization section 8. The DCT and quantization section 8 includes a DCT coefficient calculation section and a quantization section, transforms the residual signal into a signal in the frequency domain by performing the DCT transform, and quantizes its coefficients (DCT coefficients). An entropy coding section 9 variable-length codes the DCT coefficients quantized by the DCT and quantization section 8 and outputs variable-length coded data.

Besides, the DCT coefficients quantized by the DCT and quantization section 8 are inputted to a local decoder section. The local decoder section includes an inverse quantization and inverse DCT section 11, an adder 12, and a deblocking filter 13. The inverse quantization and inverse DCT section 11 performs an inverse quantization processing and inverse discrete cosine transform (IDCT) processing on the quantized DCT coefficients. The adder 12 adds the result of the inverse quantization and inverse DCT and the predicted image selected by the selection circuit 5 and generates a decoded image. The deblocking filter 13 performs a filtering processing on the decoded image created by the adder 12 in order to suppress block boundary distortion. The decoded image data outputted from the deblocking filter 13 is stored as the reference frame into the memory 4 for reference frame storage.

Incidentally, each of the function sections of the moving picture coding apparatus is constructed by hardware such as an LSI (Large Scale Integrated Circuit).

Figure 2:
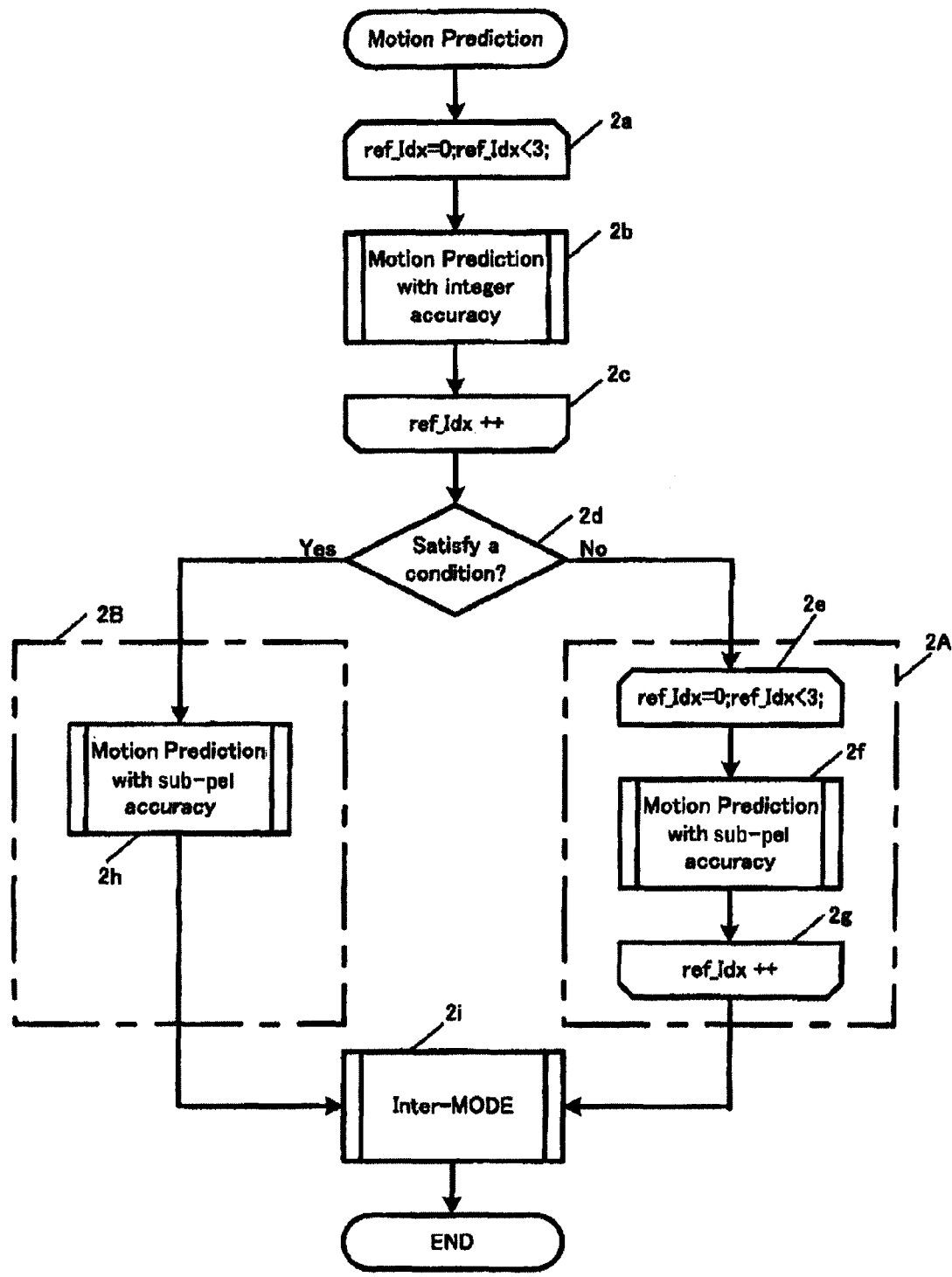
FIG. 2 is a flowchart showing a processing procedure by a motion prediction section of the moving picture coding apparatus.
Figure 3:
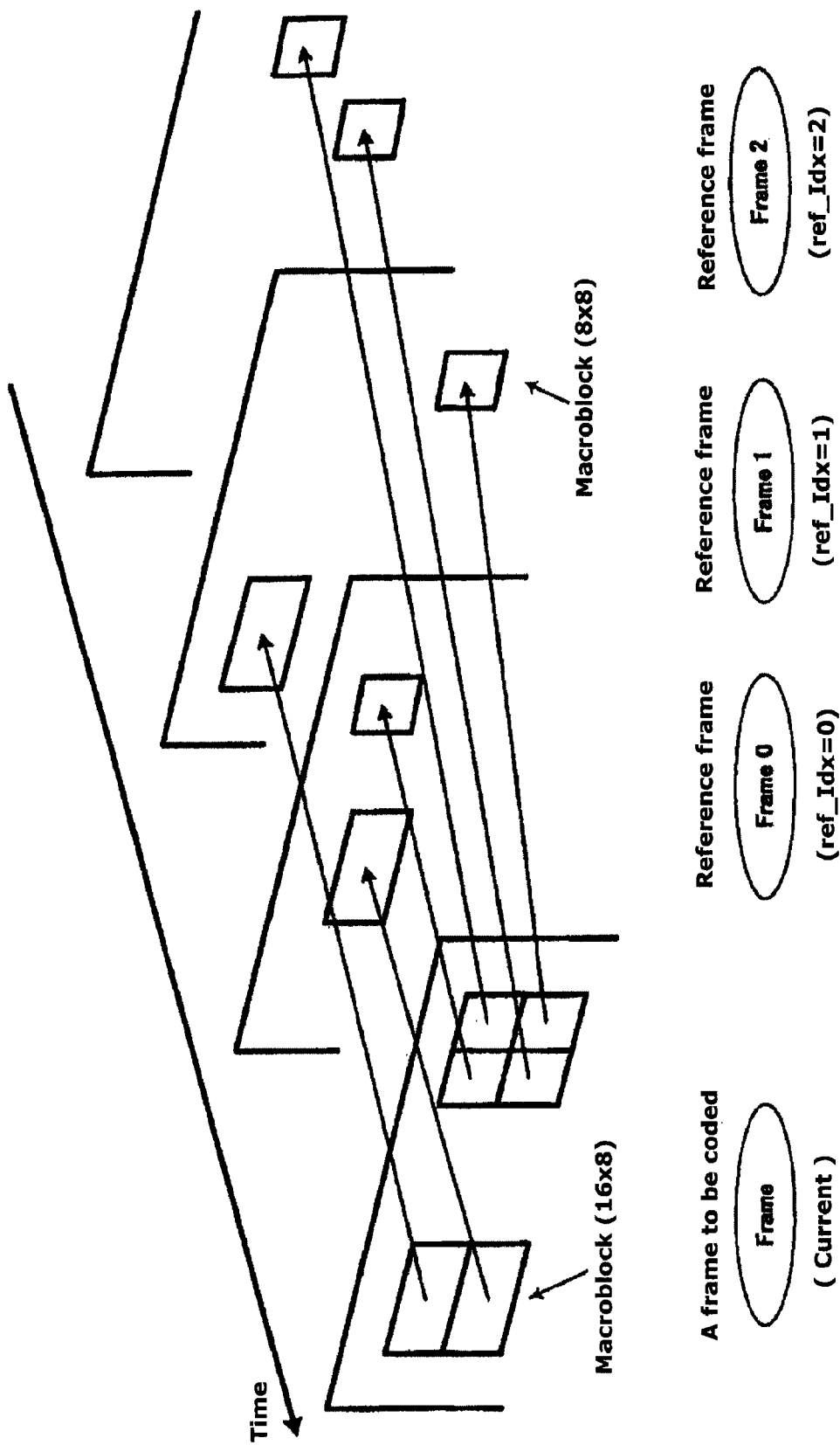
FIG. 3 is a view for explaining an operation by the motion prediction section of the moving picture coding apparatus.

Next, the operation of the motion compensated prediction by the moving picture coding apparatus as described above will be described. FIG. 2 is a flowchart showing the operation executed by the moving picture coding apparatus, and FIG. 3 is a view for explaining the operation concept of the motion compensated prediction.

It is assumed that image data of contiguous and past coded three frames are stored as reference frames in the memory 4 for reference frame storage. In this state, when an image signal of the current frame is inputted from the camera CM, the image signal is first divided into macroblocks by the blocking section 1.

Next, in the motion vector detection section 2, a processing for motion compensated prediction is performed as follows. First, the macroblock is divided into macroblock types with various sizes. As stated before, the macroblock types have four kinds: 16×16 pixels, 16×8 pixels, 8×16 pixels and 8×8 pixels. FIG. 3 shows an example thereof. Nine blocks are formed by the above division into blocks. After that, with reference to the three reference frames stored in the memory 4, the integer search is performed for each macroblock of the image data of the current frame with the selected macroblock type. The integer search is realized by step 2a to step 2c of FIG. 2.

That is, first, at step 2a, one of the reference frames, for example, the reference frame ref_Idx0 newest in time is selected. Subsequently, at step 2b, detection of a motion prediction vector is performed on the selected reference frame ref_Idx0 with integer pixel accuracy for each block in the macroblock type. When the detection of the motion prediction vector on the reference frame ref_Idx0 for each block in the macroblock type is ended, a next reference frame ref_Idx1 is selected at step 2c, and the detection of a motion prediction vector is performed on this selected reference frame ref_Idx1 with integer pixel accuracy for each block in the macroblock type. After that, similarly, at step 2a and 2c, all remaining reference frames are sequentially selected, and the detection of the motion prediction vector is performed on the selected reference frame with integer pixel accuracy for each block in the macroblock type.

In addition to that, for each block in the macroblock type, the motion vector detection section 2 determines the reference frame and the motion prediction vector which provide minimum absolute prediction error (the SAD) based on the detection result of the motion prediction vector. That is, the reference frame most appropriate for the execution of the motion compensated prediction in each block in each macroblock type is determined.

It is assumed that the detection of the motion prediction vector on all reference frames ref_Idx0, ref_Idx1 and ref_Idx2 for each block in the macroblock type is ended. Then, the motion vector detection section 2 next judges at step 2d whether or not the detection result obtained by the integer pixel search satisfies a previously set reference frame narrowing condition. For example, it is judged whether or not the reference frames regarded as most appropriate for all blocks (nine blocks) are coincident to each other, in other words, whether or not the same reference frame is selected for the candidate blocks after the integer pixel search.

As a result of this judgment, in the case where the same reference frame is selected for all the candidate blocks after the integer pixel search, a second sub-pel search mode 2B is selected. Then, at step 2h, only the reference frame selected for all the candidate blocks is selected as an object of the sub-pel pixel search, and the detection processing of the motion prediction vector is performed on the selected reference frame with sub-pel pixel accuracy. The detection of the motion prediction vector with sub-pel pixel accuracy is performed by, for example, a filtering processing on the reference frame. For example, in the ¼ accuracy search, a method of searching eight points around the position of the pixel regarded as most appropriate by the ½ accuracy search is used.

On the other hand, it is assumed that as a result of the judgment at step 2d, the same reference frame is not selected for all the candidate blocks after the integer pixel search. In this case, the motion vector detection section 2 selects a first sub-pel search mode 2A. The processing in the first sub-pel search mode 2A is such that all reference frames are selected as the objects of the sub-pel search, and the motion prediction vector is detected on all the selected reference frames with sub-pel pixel accuracy.

That is, first, at step 2e, one of the reference frames, for example, a reference frame ref_Idx0 newest in time is selected. Subsequently, at step 2f, the detection of the motion prediction vector is performed on the selected reference frame ref_Idx0 with sub-pel pixel accuracy. When the detection of the motion prediction vector on the reference frame ref_Idx0 is ended, at step 2g, a next reference frame ref_Idx1 is selected, and at step 2f, the detection of the motion prediction vector is performed on this selected reference frame ref_Idx1 with sub-pel pixel accuracy. After this, similarly, at step 2e and 2g, all remaining reference frames are sequentially selected, and the detection of the motion prediction vector is performed on each of the selected macroblocks with sub-pel pixel accuracy.

When the detection processing of the motion prediction vector in the first or the second sub-pel search mode 2A or 2B is ended, the motion vector detection section 2 judges the most appropriate inter coding mode at step 2i, and ends the series of all processings. Then, the predicted image data is created based on the result of the motion prediction, and difference image data between the predicted image data and the image data of the macroblock in the current frame is created.

Incidentally, when the difference image data is created by the motion vector detection section 2, in the DCT quantization section 8, the discrete cosine transform is performed on the difference image data, and the DTC coefficients obtained by this is quantized and is outputted as coded data. Besides, the quantized DCT coefficients are subjected to the inverse quantization and inverse discrete cosine transform in the inverse quantization and inverse DCT section 11. The reference image data is created based on the decoded data created by this, and the created reference image data is stored in the memory 4 as the reference frame for the motion compensated prediction of a subsequent frame.

As described above, in this embodiment, when the motion compensated prediction is performed on the inputted image data by the motion vector detection section 2, first, for each block in the selected macroblock type, the integer search is performed on the image data with reference to the three reference frames stored in the memory 4, and the motion prediction vector is detected. Then, based on the detection result of the motion prediction vector, the reference frame most appropriate for the execution of the motion compensated prediction is determined for each block in the macroblock type. Next, based on this determination result, it is judged whether or not the reference frames regarded as most appropriate for all blocks (nine blocks) are coincident to each other, that is, whether or not the same reference frame is selected for all candidate blocks. As a result of the judgment, when the same reference frame is selected for all the candidate blocks, only the reference frame regarded as most appropriate is utilized in the sub-pel search, and the motion prediction vector is detected with sub-pel pixel accuracy.

Accordingly, as compared with the case where the sub-pel search is always performed on all reference frames, the processing amount required for the motion compensated prediction can be reduced without lowering the accuracy of the motion compensated prediction. In general, in the motion search, there is a tendency that a reference frame just before the current frame is liable to be selected, and the number of frames to which reference is made in one macroblock becomes often only one. The main cause is that the block in a unit of 16×16 pixels is most frequently selected. Besides, in a natural image, motions existing in the same picture are often uniform, and it is conceivable that the cause is that blocks are liable to be concentrated on the same reference frame.

Accordingly, as described above, as a result of the integer search, in the case where it is judged that reference frames regarded as most appropriate for plural blocks are concentrated on one reference frame, the sub-pel search processing is performed only on the one reference frame, so that the processing amount required for the motion compensated prediction can be greatly reduced in total. As a result of this, the reduction in electric power consumption of the apparatus and reduction in cost become possible. This effect is very useful especially for the portable terminal in which one of important problems is reduction in size and weight and extension in battery life.

Besides, in the embodiment, in the case where the same reference frame is not selected for all candidate blocks, all the reference frames are made the objects of the sub-pel search, and the motion prediction vector is detected with sub-pel pixel accuracy. Thus, as a result of the motion search, even in the case where reference frames selected for one macroblock are distributed to plural reference frames, the motion compensated prediction with high accuracy becomes possible.

Incidentally, the invention is not limited to the above embodiment. For example, in the above embodiment, although the description has been made while using, as an example, the case where each of the function sections of the moving picture coding apparatus is constructed by hardware, a part of or all of them can be realized by software.

Besides, in the above embodiment, the description has been made while using, as an example, the case in which "whether or not the same reference frame is selected for all candidate blocks after the integer pixel search" is used as the judgment condition to narrow the reference frames. However, limitation is not made to that, and "whether or not the same reference frame is selected for candidate blocks the number of which is a certain number or more or the ratio of which is a certain ratio or higher after the integer pixel search" may be used. Further, the number of reference frames after narrowing is not limited to one frame, and any number may be adopted as long as the number of frames is smaller than the number of reference frames as the objects of the integer pixel search.

In addition, the structure of the function section of the moving picture coding apparatus, the processing procedure and processing content of the motion prediction section, the number of reference frames and the like can be variously modified and carried out within the scope not departing from the gist of the invention.

In summary, the invention is not limited to the embodiment just as described, and at a practical stage, the structural elements can be modified and embodied within the scope not departing from the gist. Besides, various inventions can be formed by suitable combinations of plural structural elements disclosed in the embodiment. For example, some structural elements may be deleted from all structural elements disclosed in the embodiment. Further, structural elements of different embodiments may be combined.

What is claimed is:

1. A moving picture coding apparatus, comprising:
   storing means configured to store a plurality of picture frames;
   blocking means configured to divide a frame to be coded into a plurality of blocks;
   calculating means configured to calculate a motion vector with integer accuracy between the divided blocks and the picture frames stored in the storing means;

first selecting means configured to select an optimum picture frame as a reference frame based on the calculated motion vector;

counting means configured to count, for each picture frame, a number of times the picture frame is selected as a reference frame; and second selecting means configured to select a picture frame to be used for motion compensation prediction with sub-pel accuracy if the number of times counted by the counting means for the picture frame satisfies a predetermined condition.

2. The moving picture coding apparatus according to claim 1, wherein the second selecting means select all frames stored in the storing means to be used for motion compensation prediction with sub-pel accuracy if there is no picture having the number of times counted by the counting means satisfying the predetermined condition.

3. The moving picture coding apparatus according to claim 1, wherein the second selecting means selects a picture frame to be used for motion compensation prediction if only one picture frame is selected as a reference frame by the first selecting means.

4. A moving picture coding apparatus applied to a standard in which a plurality of picture frames can be used for coding a frame, comprising:

storing means configured to store a plurality of picture frames;

blocking means configured to divide a frame to be coded into a plurality of blocks;

calculating means configured to calculate a motion vector with integer accuracy between the divided blocks and the picture frames stored in the storing means;

first selecting means configured to select an optimum picture frame as a reference frame based on the calculated motion vector;

counting means configured to count, for each picture frame, a number of times the picture frame is selected as a reference frame; and second selecting means configured to select a picture frame to be used for motion compensation prediction with sub-pel accuracy if the number of times counted by the counting means for the picture frame satisfies a predetermined condition.

5. The moving picture coding apparatus according to claim 4, wherein the second selecting means select all frames stored in the storing means to be used for motion compensation prediction with sub-pel accuracy if there is no picture having the number of times counted by the counting means satisfying the predetermined condition.

6. The moving picture coding apparatus according to claim 4, wherein the second selecting means selects a picture frame to be used for motion compensation prediction if only one picture frame is selected as a reference frame by the first selecting means.

* * * * *